(12) United States Patent
Oroskar et al.

(10) Patent No.: US 8,437,781 B1
(45) Date of Patent: May 7, 2013

(54) METHOD AND SYSTEM OF PAGING AN ACCESS TERMINAL

(75) Inventors: Siddharth S. Oroskar, Overland Park, KS (US); Jasinder P. Singh, Olathe, KS (US); Sachin R. Vargantwar, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 42 days.

(21) Appl. No.: 12/975,118

(22) Filed: Dec. 21, 2010

(51) Int. Cl.
*H04W 68/00* (2009.01)

(52) U.S. Cl.
USPC .......... 455/458; 455/449; 455/444; 455/446; 455/466; 455/63.2; 455/424; 455/507; 455/422.1

(58) Field of Classification Search .......... None
See application file for complete search history.

(56) References Cited

U.S. PATENT DOCUMENTS

| | | | |
|---|---|---|---|
| 6,161,023 A * | 12/2000 | Johnson et al. | 455/562.1 |
| 7,149,535 B1 | 12/2006 | Chaturvedi et al. | |
| 7,359,362 B2 * | 4/2008 | King et al. | 370/338 |
| 7,805,140 B2 * | 9/2010 | Friday et al. | 455/436 |
| 8,126,496 B2 * | 2/2012 | Brisebois et al. | 455/522 |
| 8,195,234 B2 * | 6/2012 | Chang et al. | 455/558 |
| 2005/0239449 A1 | 10/2005 | Timms | |
| 2008/0254814 A1 * | 10/2008 | Harris et al. | 455/458 |
| 2009/0149185 A1 * | 6/2009 | Narasimha | 455/442 |
| 2010/0291907 A1 * | 11/2010 | MacNaughtan et al. | 455/414.1 |

* cited by examiner

*Primary Examiner* — Willie J Daniel, Jr.

(57) ABSTRACT

An access network may be maintaining data indicating which of its coverage areas have a short occupancy time. The access network may then conduct a first paging of an access terminal in each coverage area in a first set of coverage areas, the first set including a subset of coverage areas having a short occupancy time. Thereafter, the access network may determine that it has not received a response to the first paging from the access terminal during a first timeout period, which is preferably shorter than a predefined paging timeout period. In response, the access network may conduct a second paging of the access terminal in only each coverage area in the subset of coverage areas (i.e., the coverage area(s) in the first set of coverage areas that have the short occupancy time).

20 Claims, 3 Drawing Sheets

METHOD AND SYSTEM OF PAGING AN ACCESS TERMINAL

BACKGROUND

To provide cellular wireless service, a wireless-service provider typically employs an access network that provides wireless service to one or more access terminals (e.g., cell phones, PDAs, laptops, netbooks, tablets, and/or other wirelessly-equipped devices) in a plurality of service areas. Each such service area may be divided geographically into a number of coverage areas, such as cells and sectors, each defined by a radio frequency (RF) radiation pattern from a respective base transceiver station (BTS). Within each coverage area, the BTS's RF-radiation pattern may provide one or more wireless links, each on a carrier (or set of carriers), over which access terminals may communicate with the access network. In turn, the access network may provide connectivity with the one or more transport networks, such as the public switched telephone network (PSTN) and/or the Internet.

The wireless links may carry communications between the access network and the access terminals according to any of a variety of wireless protocols. Depending on the protocol employed, each wireless link may also be divided into a plurality of channels for carrying communications between the access network and the access terminals. For example, each wireless link may include a plurality of forward-link channels, such as forward traffic channels and forward paging channels, for carrying communications from the access network to the access terminals. As another example, each wireless link may include a plurality of reverse-link channels, such as reverse traffic channels and reverse access channels, for carrying communications from the access terminals to the access network. Typically, the number of channels on a given wireless link, and thus the number of simultaneous communications the given wireless link can carry, is limited by hardware and/or protocol constraints. As such, an access network may use various techniques to conserve its limited supply of wireless-link channels.

One common way an access network conserves its wireless-link channels is by employing a paging process to locate an idle access terminal before assigning a traffic channel to that access terminal. According to an example paging process, the access network may initiate a sequence of pages of the idle access terminal in the service area in which the access terminal last registered with the access network (i.e., the last-known service area). For instance, the access network may page the idle access terminal a first time in a first set of coverage areas within the last-known service area. If the access network does not receive a page response from the access terminal after a given timeout period (e.g., 10 seconds), the access network may then page the access terminal a second time in a second (typically larger) set of coverage areas within the last-known service area. The access network may continue this process until it receives a page response from the access terminal, until it pages the access terminal in all coverage areas within the last-known service area, and/or until it reaches a time or attempt limit, among other possibilities.

OVERVIEW

In a given access network, there may be certain coverage areas in which access terminals tend to spend a short amount of time relative to other coverage areas (i.e., coverage areas tending to have a short "occupancy time"). For example, coverage areas in which high-speed roadways and/or transit lines are located may have a short occupancy time. Due to this short occupancy time, the likelihood of successfully paging an idle-mode access terminal in these coverage areas is lower relative to other coverage areas. Accordingly, a paging process that addresses this lower likelihood of successfully paging an idle-mode access terminal in coverage areas having a short occupancy time is desired.

Disclosed herein is such a paging process. Preferably, while carrying out the disclosed paging process, the access network will be maintaining data indicating which of its coverage areas have a short occupancy time. The access network may then conduct a first paging of an access terminal in each coverage area in a first set of coverage areas, the first set including a subset of coverage areas having a short occupancy time. (It should be understood that each set and subset of coverage areas may include only a single coverage area). Thereafter, the access network may determine that it has not received a response to the first paging from the access terminal during a first timeout period, which is preferably shorter than a predefined paging timeout period. In response, the access network may conduct a second paging of the access terminal in only each coverage area in the subset of coverage areas (i.e., the coverage area(s) in the first set of coverage areas that have a short occupancy time). As a result, the access network may increase the rate at which it pages access terminals in coverage areas having a short occupancy time and thereby increase the likelihood of successfully paging access terminals in such coverage areas. This increased likelihood of successfully paging access terminals in coverage areas having a short occupancy time may in turn decrease both call-setup time and paging-channel occupancy in other coverage areas (e.g., coverage areas in the second set of coverage areas).

One embodiment of the disclosed paging process may take the form of a method that includes an access network (a) conducting a first paging of an access terminal in each coverage area in a first set of coverage areas, the first set including a subset of coverage areas having a short occupancy time, and (b) thereafter determining that it has not received a response to the first paging from the access terminal during a first timeout period, and responsively conducting a second paging of the access terminal in only each coverage area in the subset of coverage areas. Preferably, the first timeout period will be shorter than a predefined paging timeout period (e.g. one cycle of a paging channel versus two cycles of the paging channel).

The subset of coverage areas having a short occupancy time may take various forms. In one example, the subset may include one or more coverage areas pre-designated as having a short occupancy time. As another example, the subset may include one or more coverage areas having a representative occupancy time below a threshold occupancy time. Other examples are possible as well.

Along with carrying out the functions of this method, access network may also carry out one or more additional functions. For instance, the access network may additionally be maintaining data indicating which coverage areas of access network have a short occupancy time, in which case the access terminal may identify the subset of coverage areas based on such maintained data. This maintained data may take various forms. In one example, the maintained data may include a respective data bit for each of a plurality of coverage areas that specifies whether the coverage area has a short occupancy time. The access terminal may also update the maintained data in various manners. As one example, the access terminal may update this data for a given coverage area based on an instruction to designate the given coverage area as having a short occupancy time. As another example, the access terminal may update this data for a given coverage area based on data defining the operation of access terminals in the given coverage area. Other examples are possible as well.

Also disclosed herein is an example access-network entity that includes (a) a communication interface configured to facilitate communication with access terminals located in one or more coverage areas of an access network, (b) a processor, (c) data storage, and (d) program instructions stored in data storage and executable by the processor to carry out the functions described herein.

These as well as other aspects and advantages will become apparent to those of ordinary skill in the art by reading the following detailed description, with reference where appropriate to the accompanying drawings.

DETAILED DESCRIPTION

I. Communication System

Figure 1:
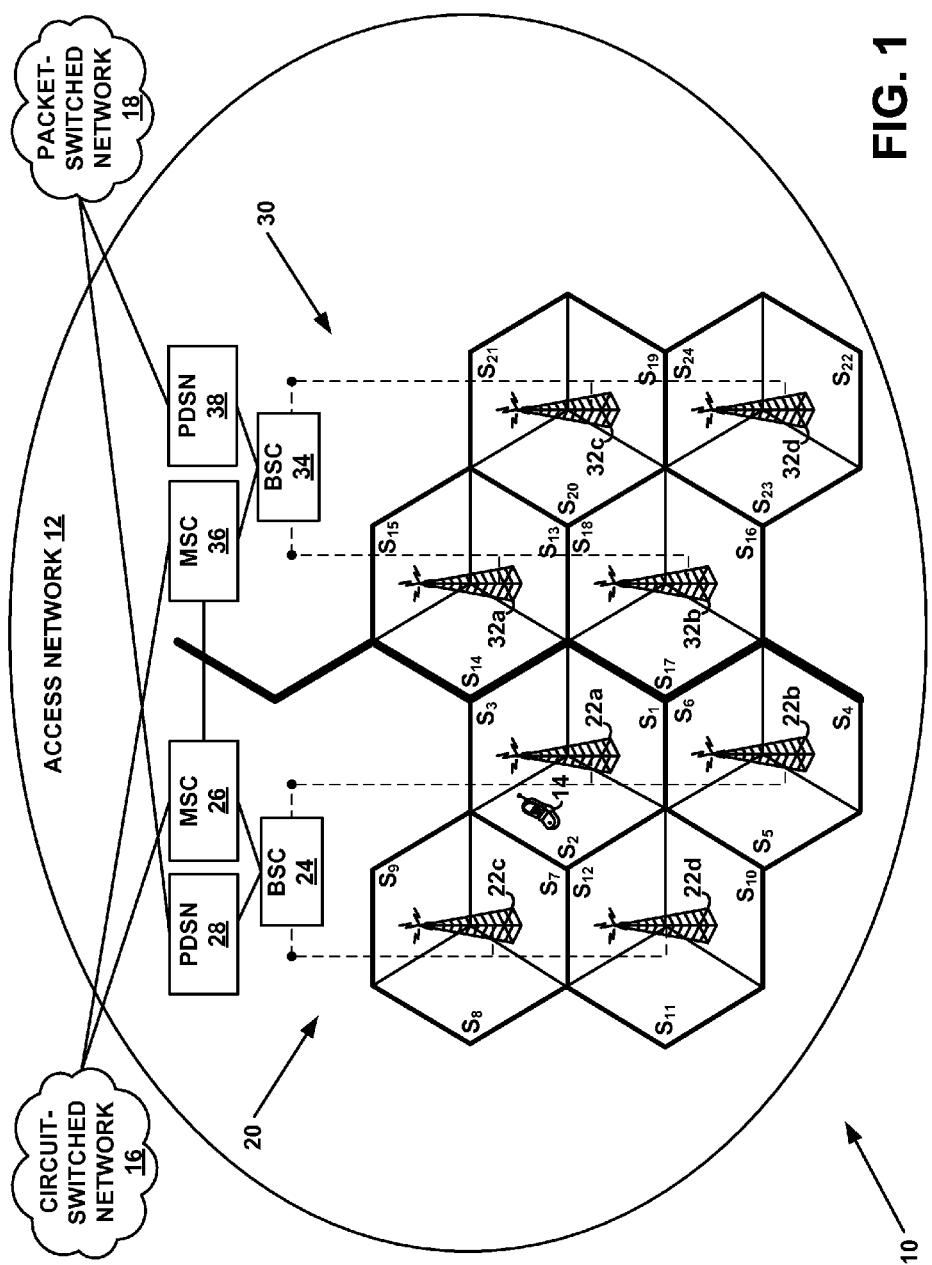
FIG. 1 is a simplified block diagram of a communication system in which at least one embodiment can be implemented.

Referring to the drawings, FIG. 1 is a simplified block diagram of a communication system 10 in which at least one embodiment can be implemented. It should be understood, however, that the arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions written in any suitable programming language (e.g., C, C++, Java, etc.) and stored in memory.

As shown in FIG. 1, system 10 may include an access network 12 comprised of a plurality of serving systems, such as a first serving system 20 and a second serving system 30. (Although FIG. 1 depicts access network 12 as including two serving systems, it should be understood that access network 12 may include more than two serving systems.) Each serving system of access network 12 may be configured to provide wireless service to one or more access terminals, such as access terminal 14, in a respective service area.

Each serving system of access network 12 may include one or more base transceiver stations (BTSs), such as BTSs 22a-d in serving system 20 and BTSs 32a-d in serving system 30. (Although FIG. 1 depicts each serving system as including four BTSs, it should be understood that each serving system may include more or less than four BTSs.) Each BTS may be any entity that facilitates wireless communication between access network 12 and one or more access terminals, such as access terminal 14. In particular, each BTS may radiate to define one or more wireless coverage areas, such as a cell and/or cell sectors. Within each of its coverage areas, each BTS may provide at least one wireless link (not shown) on a respective carrier frequency (or set of carrier frequencies) over which the BTS may communicate with access terminal 14. Each BTS may also function to control aspects of wireless communication with access terminal 14, such as aspects of paging, connection establishment, handoff, and/or power control for instance. Each BTS may perform other functions as well.

For purposes of illustration, FIG. 1 depicts each BTS as radiating to define three cell sectors. In particular, as shown in serving system 20, BTS 22a may radiate to define sectors $S_1$-$S_3$, BTS 22b may radiate to define sectors $S_4$-$S_6$, BTS 22c may radiate to define sectors $S_7$-$S_9$, and BTS 22d may radiate to define sectors $S_{10}$-$S_{12}$. Further, as shown in serving system 30, BTS 32a may radiate to define sectors $S_{13}$-$S_{15}$, BTS 32b may radiate to define sectors $S_{16}$-$S_{18}$, BTS 32c may radiate to define sectors $S_{19}$-$S_{21}$, and BTS 32d may radiate to define sectors $S_{22}$-$S_{24}$. It should be understood, however, that the depicted configuration of sectors and wireless links is for purposes of illustration only, and that many other examples are possible as well.

Each wireless link provided by access network 12 may carry communications between the serving system and access terminal 14 according to any of a variety of protocols, including CDMA (e.g., EIA/TIA/IS-2000 Rel. 0, Rel. A, or other versions thereof ("IS-2000"), EIA/TIA/IS-856 Rel. 0, Rev. A, or other versions thereof ("IS-856"), etc.), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, or other protocols now known or later developed. Further, each wireless link may be divided into a forward link for carrying communications from access network 12 to one or more access terminals and a reverse link for carrying communications from one or more access terminals to access network 12. Further yet, each forward and reverse link may be divided into a plurality of channels using any mechanism now known or later developed, including code division multiplexing, time division multiplexing, and/or frequency division multiplexing for instance.

Referring again to FIG. 1, each serving system may include at least one base station controller (BSC) (also know as a radio network controller), such as BSC 24 in serving system 20 and BSC 34 in serving system 30, to which BTSs in the serving system couple. (Although FIG. 1 depicts each serving system as including one BSC that couples to all BTSs, it should be understood that a serving system may include more than one BSC, in which case each BSC may couple to a subset of the BTSs in each serving system. Further, although each BSC is depicted as a separate entity from its coupled BTSs, it should be understood that each BSC may be integrated together in whole or in part with one or more BTS.) Each BSC may control aspects of its coupled BTSs as well as aspects of wireless communication with access terminal 14, such as aspects of paging, connection establishment, handoff, and/or power control for instance. Each BSC may perform other functions as well.

Each serving system may also include one mobile switching center (MSC), such as MSC 26 in serving system 20 and MSC 36 in serving system 30, to which each BSC in the serving system couples. As shown, each MSC may provide connectivity with a circuit-switched network 16 (e.g., the public switched telephone network (PSTN)). Further, each MSC may provide connectivity with other MSCs in access network 12 (e.g., via a signaling link or network), thereby facilitating communication between the serving systems of access network 12. Further yet, each MSC may control aspects of its coupled BTS(s) and/or BSC(s) as well as aspects of wireless communication with access terminal 14, such as aspects of paging, connection establishment, handoff, and/or power control for instance.

Each serving system may further include one packet data serving node (PDSN), such as PDSN 28 in serving system 20 and PDSN 38 in serving system 30, to which each BSC couples. As shown, each PDSN may provide connectivity with a packet-switched network 16 (e.g., the Internet). Each PSDN may perform other functions as well.

Although not shown, the serving systems of access network 12 may also include and/or have access to various other entities. For example, each serving system may include or have access to a home location register (HLR) and/or a visitor location register (VLR) that maintains profile data for subscribers and/or access terminals in access network 12, such as account information, preferences, and/or a last-known location for instance. Other examples are possible as well.

Access terminal 14 may be any device configured to receive wireless service from access network 12. By way of example only, access terminal 14 may take the form of a cellular telephone, a computer (e.g., a desktop, laptop, tablet, netbook, etc.), a personal digital assistant (PDA), or a personal navigation device (PND). Other examples are possible as well.

II. Current Paging Process

In the example communication system 10 of FIG. 1, access network 12 may employ a paging process to locate access terminal 14 before assigning it a forward traffic channel. This paging process may take various forms.

According to an example paging process, access network 12 may first determine a location of access terminal 14 when it last registered with access network 12 (e.g., by consulting a HLR). In turn, the serving system in which access terminal 14 last registered (e.g., serving system 20) may initiate a sequence of pages of access terminal 14. For instance, serving system 20 may conduct a first paging of access terminal 14 in a first set of coverage areas of serving system 20, which preferably includes the coverage area in which access terminal 14 last registered. If serving system 20 does not receive a page response from access network 14 after a predefined timeout period (e.g., 10 seconds), serving system 20 may then conduct a second paging of access terminal 14 in a second set of coverage areas of serving system 20, which may include all of the coverage areas in the first paging area and one or more additional coverage areas of serving system 20. Serving system 20 may continue this process in a similar manner until it receives a page response from access terminal 14, until it pages access terminal 14 in all coverage areas of serving system 20, and/or until it reaches a time or attempt limit, among other possibilities.

Serving system 20 may conduct a given paging of access terminal 14 in various manners. In one example, BSC 24 and/or MSC 26 may first identify the set of coverage areas in which to page access terminal 14 using any technique now known or later developed. For instance, BSC 24 and/or MSC 26 may identify the set of coverage areas using zone-based paging techniques, in which case the set of coverage areas may include coverage areas of serving system 20 that are within one or more predefined paging "zones." Alternatively, BSC 24 and/or MSC 26 may identify the set of coverage areas using distance-based paging techniques, in which case the set of coverage areas may include coverage areas of serving system 20 that are at least partially within a predefined distance from the last-known location of access terminal 14. Other examples are possible as well. After identifying the set of coverage areas in which to page access terminal 14, BSC 24 and/or 26 may then direct each BTS serving at least one coverage area of the set of coverage areas to send a page message for receipt by access terminal 14. In turn, each such BTS may send a page message addressed to access terminal 14 on a paging channel in the defined local paging area. (As used herein, a "paging channel" may be any channel configured to carry page messages, including without limitation an IS-2000 paging channel and an IS-856 control channel). Serving system 20 may conduct a given paging of access terminal 14 in other manners as well.

III. Disclosed Paging Process

As discussed above, in the example communication system 10 of FIG. 1, there may be certain coverage areas in which access terminals tend to spend a short amount of time relative to other coverage areas (i.e., coverage areas tending to have a short "occupancy time"). For example, coverage areas in which high-speed roadways and/or transit lines are located may have a short occupancy time. Due to this short occupancy time, the likelihood of successfully paging an idle-mode access terminal in these coverage areas is lower relative to other coverage areas. Accordingly, a paging process that addresses this lower likelihood of successfully paging an idle-mode access terminal in coverage areas having a short occupancy time is desired.

Figure 2:
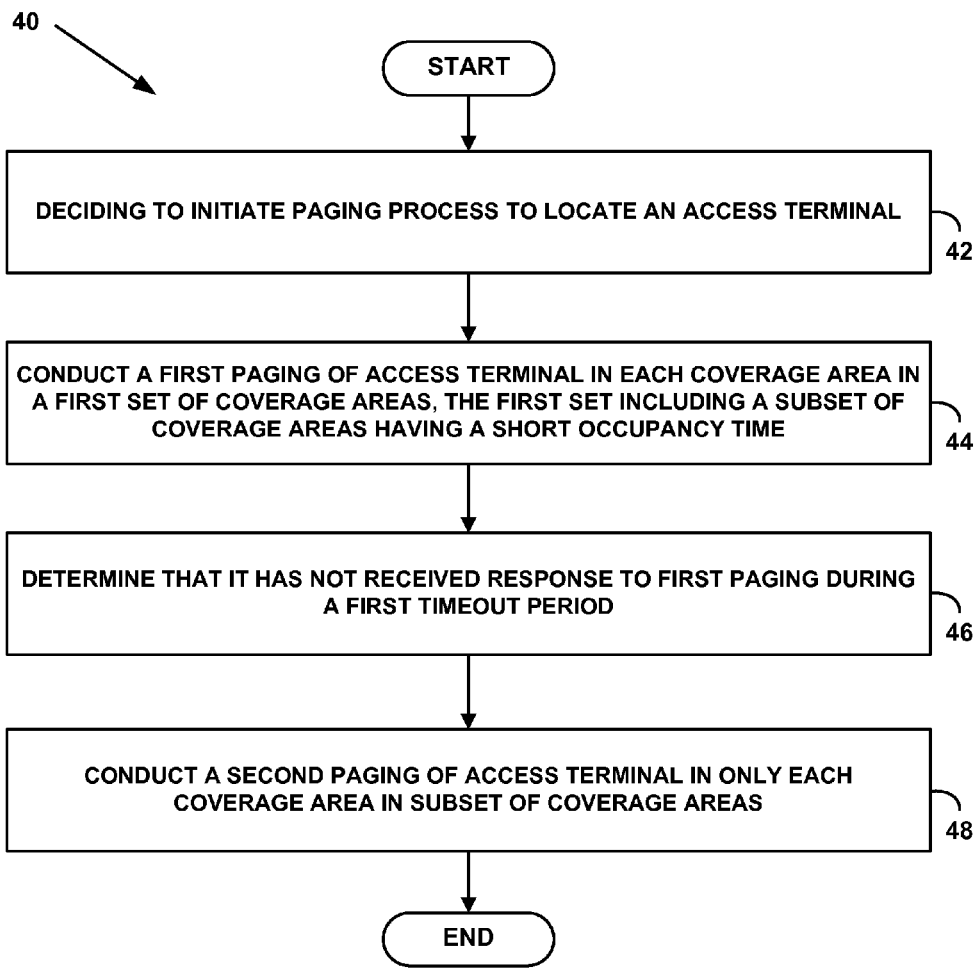
FIG. 2 is a simplified flow chart depicting at least one embodiment.

FIG. 2 is a flow chart depicting an embodiment 40 of such a paging process. For purposes of illustration, embodiment 40 will be described with reference to access network 12 carrying out the disclosed paging process to locate access terminal 14. It should be understood, however, that embodiment 40 may be applicable to any configuration in which an access network is paging an access terminal.

Preferably, while carrying out embodiment 40, access network 12 will be maintaining occupancy-time data that indicates which coverage areas of access network 12 have a short occupancy time. This occupancy-time data may take various forms. As one possible example, the data occupancy-time may take the form of a data bit for each coverage area specifying whether the coverage area as a short occupancy time. Other examples are possible as well.

Access network 12 may update the maintained occupancy-time data using various techniques. According to one technique, access network 12 may update the maintained occupancy-time data for a given coverage area based on user input, such as an instruction to designate the given coverage area has having a short occupancy time.

According to another technique, access network 12 may update the maintained occupancy-time data for a given coverage area based on data defining the operation of access terminals in the given coverage area (e.g., active set data). For instance, for each access terminal that actively communicates in the given coverage area during a given period of time, access network 12 may calculate a difference between a time at which the access terminal begins actively communicating in the given coverage area and a time at which the access terminal stops actively communicating in the given coverage area. Based on the respective calculated difference for each access terminal that actively communicates in the given coverage area during a given period of time, access network 12 may then calculate a representative occupancy time for the given coverage area. In turn, access network 12 may compare the representative occupancy time for the given coverage area to a threshold occupancy time and thereby determine whether to update the maintained occupancy-time data for the given coverage area.

As shown in FIG. 2, embodiment 40 may then begin at step 42 with access network 12 deciding to initiate a paging process to locate access terminal 14. Access network 12 may decide to initiate this paging process in response to various trigger events. For example, access network 12 may decide to page access terminal 14 in response to receiving an incoming communication for access network 14, such as a phone call, a packet data transmission, and/or a short message service (SMS) message for instance. Other examples are possible as well.

At step 44, in response to deciding to initiate the paging process, access network 12—and in particular the serving system in which access terminal 14 last registered (e.g., serving system 20)—may then conduct a first paging of access terminal 14 in each coverage area in a first set of coverage areas, the first set including a subset of coverage areas having a short occupancy time.

Serving system 20 may identify this first set of coverage areas using any technique now known or later developed, including zone-based paging techniques and/or distance-based paging techniques. Serving system 20 may then conduct the first paging of access terminal 14 in various manners. In one example, BSC 24 and/or MSC 26 of serving system 20 may direct each BTS serving at least one coverage area of the first set of coverage areas to send a first page message for receipt by access terminal 14 in the at least one coverage area. In turn, each such BTS may send a first page message directed to access terminal 14 on a paging channel serving the at least one coverage area of the first paging area. Serving system 20 may conduct the first paging of access terminal 14 in other manners as well.

At step 46, serving system 20 may determine that it has not received a response to the first paging from access terminal 14 during a first timeout period. Preferably, this first timeout period will be shorter than a predefined paging timeout period. In one example, this first timeout period may be approximately the duration of one cycle of a paging channel, whereas the predefined paging timeout period may be approximately the duration of two cycles of the paging channel. Other examples are possible as well.

At step 48, in response to determining that it has not received a response to the first paging during from access terminal 14 a first timeout period, serving system 20 may then conduct a second paging of access terminal 14 in only each coverage area in the subset of coverage areas (i.e., the coverage area(s) in the first set of coverage areas that have a short occupancy time). Serving system 20 may identify the subset of coverage areas using various techniques. Preferably, serving system 20 will perform this identification based on the maintained occupancy-time data described above. For instance, access network 12 may access data indicating which coverage areas in the first set of coverage areas have a short occupancy time. Based on the accessed data, access network 12 may then identify the subset of coverage areas. Other examples are possible as well.

Serving system 20 may conduct the second paging of access terminal 14 in various manners. In one example, BSC 24 and/or MSC 26 of serving system 20 may direct each BTS serving at least one coverage area of the subset of coverage areas to send a second page message for receipt by access terminal 14 in the at least one coverage area. In another example, each BTS serving at least one identified coverage area of the first paging area may decide to send a second page message for receipt by access terminal 14 without direction from BSC 24 and/or MSC 26. In either case, each such BTS may then send a second page message directed to access terminal 14 on a paging channel serving the at least one coverage area of the subset of coverage areas. Serving system 20 may conduct the second paging of access terminal 14 in other manners as well.

Advantageously, embodiment 40 enables access network 12 to conduct a second paging of access terminal 14 in the coverage areas in a first set of coverage areas that have a short occupancy time before conducting a paging of access terminal 14 in a second (and typically larger) set of coverage area. As a result, access network 12 may increase the rate at which it pages access terminals in such coverage areas and thereby increase the likelihood of successfully paging access terminals in coverage areas having a short occupancy time. This increased likelihood of successfully paging access terminals in coverage areas having a short occupancy time may in turn decrease both call-setup time and paging-channel occupancy in other coverage areas (e.g., coverage areas in the second set of coverage areas).

IV. Example Access-Network Entity

Figure 3:
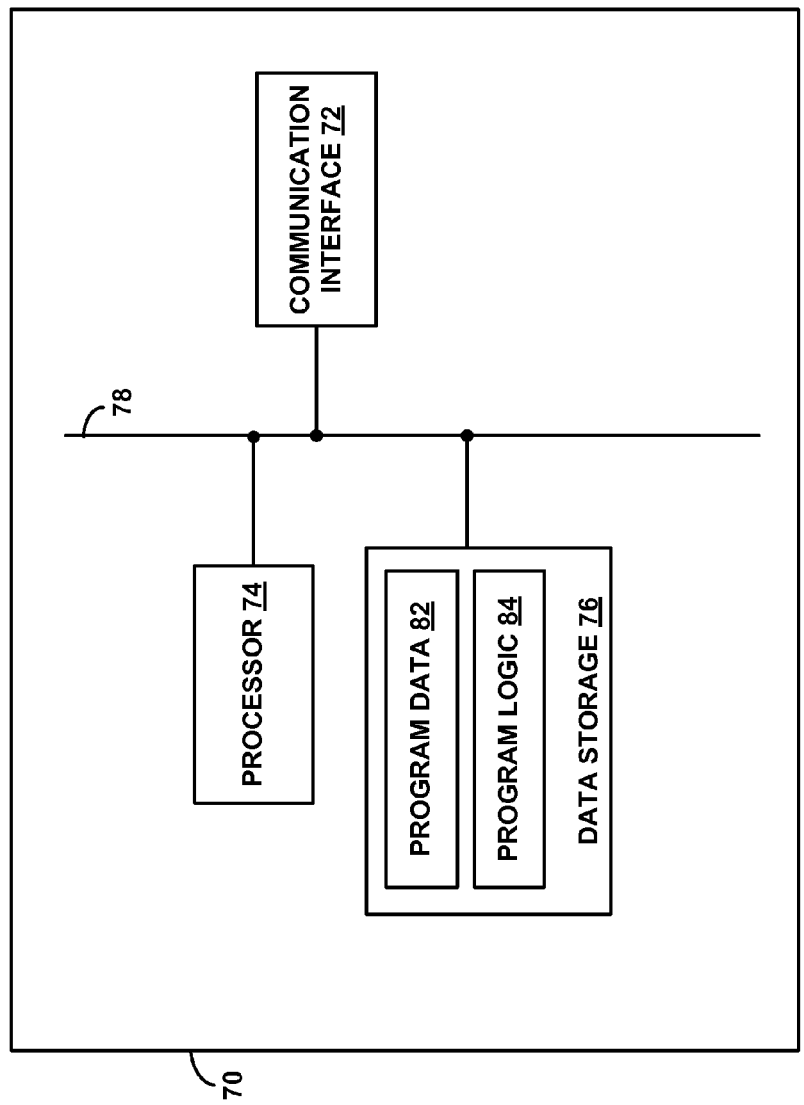
FIG. 3 is a simplified block diagram showing functional components of an example mobile switching center capable of carrying out at least one embodiment.

FIG. 3 is a simplified block diagram showing functional components of an example access-network entity 70 that is configured to carry out functions of at least one embodiment. Access-network entity 70 may take the form of an MSC, a base station, and/or some other access-network entity capable of carrying out features of at least one embodiment. As shown in FIG. 3, access-network entity 70 may include a communication interface 72, a processor 74, and data storage 76, all linked together via a system bus, network, or other connection mechanism 78. Access-network entity 70 may include other components as well.

Referring to FIG. 3, communication interface 72 may be configured to communicatively couple access-network entity 70 to various other entities. For example, if access-network entity 70 takes the form of an MSC, communication interface 72 may be configured to communicatively couple the MSC to one or more BSCs, one or more other MSCs, and/or one or more circuit-switched networks, among other entities. Other examples are possible as well. As another example, if access-network entity 70 takes the form of a base station, communication interface 72 may be configured to communicatively couple the base station to one or more access terminals, one or more MSCs, and/or one or more PDSNs, among other entities. To facilitate these couplings, communication interface 72 may take various forms. For example, communication interface 72 may take the form of an Ethernet interface, a serial bus interface (e.g., Firewire, USB 2.0, etc.), one or more antennas adapted to facilitate wireless communication according a desired protocol, and/or any other interface that provides for wired and/or wireless communication with an entity. Communication interface 72 may also include some combination of different interfaces types. Other configurations are possible as well.

Processor 74 may comprise one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), or other processor components now known or later developed. Data storage 76, in turn, may comprise one or more non-transitory computerreadable storage mediums, such as volatile data storage mediums (e.g., random access memory (RAM), registers, and/or cache) and/or non-volatile data storage mediums (e.g., read only memory (ROM), a hard disk drive, a solid state drive, flash memory, and/or an optical storage device). Some data storage mediums may be integrated in whole or in part with processor 74. Further, some data storage mediums may be external to and/or removable from access-network entity 70 and may interface with access-network entity 70 in various manners. As shown, data storage 76 may contain (i) program data 82 and (ii) program logic 84, which may be maintained either separately or together within data storage 76.

Program data 82 may contain information relating to the wireless links and/or coverage areas of access-network entity 70. For example, program data 82 may contain an identifier of each such wireless link (e.g., a carrier frequency and a PN offset). As another example, program data 82 may contain identifiers of forward and/or reverse channels on each such wireless link (e.g., MAC IDs and/or Walsh codes). As still another example, program data 82 may contain data defining each such coverage area (e.g., indications of the shape, size, location, and/or paging zone(s) of each coverage area). As a further example, program data 82 may contain data defining whether each such coverage area has a short occupancy time. Other examples are possible as well.

Additionally, program data 82 may contain information relating to one or more access terminals being served by access-network entity 70. For example, program data 82 may contain an identifier of each such access terminal. As another example, program data 82 may contain an identifier of any wireless link serving each such access terminal. As yet another example, program data 82 may contain identifiers of any forward and/or reverse channels established with each such access terminal (e.g., MAC IDs and/or Walsh codes). As a further example, program data 82 may contain an indicator of a last-known location of each such access terminal. As still a further example, program data 82 may contain data defining an active set of each such access terminal. Other examples are possible as well.

Program logic 84 preferably comprises machine-language instructions that may be executed or interpreted by processor 74 to carry out functions in accordance with the embodiments of the paging process disclosed herein. For example, program logic 84 may be executable by processor 74 to (a) decide to initiate a paging process to locate an access terminal, (b) in response to the decision, conduct a first paging of the access terminal in each coverage area in a first set of coverage areas, the first set including a subset of coverage areas having a short occupancy time, (c) determine that access-network entity 70 has not received a response to the first paging from the access terminal during a first timeout period, and (d) in response to the determination, conduct a second paging of access terminal 14 in only each coverage area in the subset of coverage areas. As another example, program logic 84 may be executable by processor 74 to maintain occupancy-time data that indicates which coverage areas of the access network have a short occupancy time. Program logic 84 may be executable by processor 74 to carry out various other functions as well.

V. Conclusion

Embodiments have been described above. Those skilled in the art will understand, however, that changes and modifications may be made to the embodiments described without departing from the true scope and spirit of the present invention, which is defined by the claims.

We claim:

1. A method comprising:
   an access network maintaining data indicating which coverage areas of the access network have a short occupancy time, wherein the maintained data for at least a first coverage area is updated based on data defining the operation of access terminals in the first coverage area;
   the access network conducting a first paging of an access terminal in each coverage area in a first set of coverage areas;
   the access network determining that the access network has not received a response to the first paging from the access terminal during a first timeout period;
   the access network identifying, in the first set of coverage areas, a subset of one or more coverage areas having a short occupancy time; and
   in response to determining that the access network has not received a response to the first paging, the access network conducting a second paging of the access terminal in only each coverage area in the identified subset of one or more coverage areas.

2. The method of claim 1, wherein the identified subset of one or more coverage areas comprises one or more coverage areas pre-designated as having a short occupancy time.

3. The method of claim 1, wherein the identified subset of one or more coverage areas comprises one or more coverage areas having a representative occupancy time below a threshold occupancy time.

4. The method of claim 1, wherein the data indicating which coverage areas of the access network have a short occupancy time comprises a respective data bit for each of a plurality of coverage areas that specifies whether the coverage area has a short occupancy time.

5. The method of claim 1, wherein
   the maintained data for a at least a second coverage area is updated based on an instruction to designate the second coverage area as having a short occupancy time.

6. The method of claim 1, wherein updating the maintained data for the first coverage area based on data defining the operation of access terminals in the first coverage area comprises:
   for each access terminal that actively communicates in the first coverage area during a given period of time, calculating a difference between a time at which the access terminal begins actively communicating in the first coverage area and a time at which the access terminal stops actively communicating in the first coverage area;
   based on the respective calculated difference for each access terminal that actively communicates in the first coverage area during a given period of time, calculating a representative occupancy time for the first coverage area; and
   comparing the representative occupancy time for the given coverage area to a threshold occupancy time and thereby determining whether to update the maintained data for the first coverage area.

7. The method of claim 1, wherein identifying the subset of one or more coverage areas having a short occupancy time comprises identifying the subset of one or more coverage areas based on the maintained data indicating which coverage areas of the access network have a short occupancy time.

8. The method of claim 7, wherein identifying the subset of one or more coverage areas based on the maintained data indicating which coverage areas of the access network have a short occupancy time comprises:
   accessing data indicating which coverage areas in the first set of coverage areas have a short occupancy time; and based on the accessed data, identifying the subset of one or more coverage areas.

9. The method of claim 1, wherein the first timeout period is shorter than a predefined paging timeout period.

10. The method of claim 9, wherein the first timeout period is approximately the duration of one slot cycle of a paging channel and the predefined paging timeout period is approximately the duration of two slot cycles of the paging channel.

11. The method of claim 1, wherein the identifying the subset of one or more coverage areas having a short occupancy time comprises one of:
identifying the subset of one or more coverage areas having a short occupancy time before determining that the access network has not received a response to the first paging; and
identifying the subset of one or more coverage areas having a short occupancy time in response to determining that the access network has not received a response to the first paging.

12. The method of claim 1, wherein the subset of one or more coverage areas is a proper subset of the first set of coverage areas.

13. An access-network entity comprising:
a communication interface configured to facilitate communication with access terminals located in one or more coverage areas of an access network;
a processor;
data storage; and
program instructions stored in data storage and executable by the processor to:
maintain data indicating which coverage areas of the access network have a short occupancy time, wherein the maintained data for at least a first coverage area is updated based on data defining the operation of access terminals in the first coverage area;
conduct a first paging of an access terminal in each coverage area in a first set of coverage areas, the first set including a subset of coverage areas having a short occupancy time;
thereafter determine that the access-network entity has not received a response to the first paging from the access terminal during a first timeout period,
identify, in the first set of coverage areas, a subset of one or more coverage areas having a short occupancy time, and
in response to the determination that the access-network entity has not received a response to the first paging, conduct a second paging of the access terminal in only each coverage area in the identified subset of one or more coverage areas.

14. The access-network entity of claim 13, wherein the identified subset of one or more coverage areas comprises one or more coverage areas pre-designated as having a short occupancy time.

15. The access-network entity of claim 13, wherein the identified subset of one or more coverage areas comprises one or more coverage areas having a representative occupancy time below a threshold occupancy time.

16. The access-network entity of claim 13, wherein the data indicating which coverage areas of the access network have a short occupancy time comprises a respective data bit for each of a plurality of coverage areas that specifies whether the coverage area has a short occupancy time.

17. The access-network entity of claim 13, wherein the program instructions stored in data storage and executable by the processor to identify the subset of one or more coverage areas having a short occupancy time comprise program instructions stored in data storage and executable by the processor to:
identify the subset of one or more coverage areas based on the maintained data indicating which coverage areas of the access network have a short occupancy time.

18. The access-network entity of claim 17, wherein the program instructions stored in data storage and executable by the processor to identify the subset of one or more coverage areas based on the maintained data indicating which coverage areas of the access network have a short occupancy time comprise program instructions stored in data storage and executable by the processor to:
access data indicating which coverage areas in the first set of coverage areas have a short occupancy time; and
based on the accessed data, identify the subset of coverage areas having a short occupancy time.

19. The access-network entity of claim 13, wherein the first timeout period is shorter than a predefined paging timeout period.

20. A method comprising:
an access network maintaining data indicating which coverage areas of the access network have a short occupancy time, wherein the maintained data for at least a first coverage area is updated based on data defining the operation of access terminals in the first coverage area;
an access network conducting a first paging of an access terminal in each coverage area in a given set of coverage areas, the given set including a proper subset of one or more coverage areas having a short occupancy time;
the access network determining that the access network has not received a response to the first paging from the access terminal during a first timeout period; and
in response to the determining, conducting a second paging of the access terminal in only each coverage area in the proper subset of one or more coverage areas.

* * * * *